US006789572B2

(12) United States Patent
Pierog et al.

(10) Patent No.: US 6,789,572 B2
(45) Date of Patent: Sep. 14, 2004

(54) CONTROL VALVE WITH INTEGRAL SOLENOID AND REGULATOR FOR GAS APPLIANCES

(75) Inventors: Dennis W. Pierog, Hoffman Estates, IL (US); Tam Nguyen, Summit, IL (US); Ronald S. Joyce, Elk Grove, IL (US); Paul Schneider, Naperville, IL (US)

(73) Assignee: Robertshaw Controls Company, Carol Stream, IL (US)

( * ) Notice: Subject to any disclaimer, the term of this patent is extended or adjusted under 35 U.S.C. 154(b) by 139 days.

(21) Appl. No.: 10/192,846

(22) Filed: Jul. 11, 2002

(65) Prior Publication Data

US 2003/0020037 A1 Jan. 30, 2003

Related U.S. Application Data

(60) Provisional application No. 60/304,429, filed on Jul. 12, 2001.

(51) Int. Cl.[7] .............................................. F16K 31/02
(52) U.S. Cl. .................................. 137/613; 251/129.01
(58) Field of Search ................................. 137/613, 505; 251/129.01

(56) References Cited

U.S. PATENT DOCUMENTS

| 3,308,847 | A | * | 3/1967 | Umann ........................ 137/613 |
| 4,044,794 | A | * | 8/1977 | Matthews .................... 137/613 |
| 4,718,448 | A | * | 1/1988 | Love et al. .................. 137/613 |
| 5,988,215 | A | * | 11/1999 | Martin et al. ............... 137/613 |
| 6,378,510 | B1 | * | 4/2002 | Green et al. ........... 123/568.27 |
| 6,675,831 | B2 | * | 1/2004 | Sakaguchi et al. .......... 137/613 |

* cited by examiner

Primary Examiner—Kevin Lee
(74) Attorney, Agent, or Firm—Leydig, Voit & Mayer, Ltd

(57) ABSTRACT

A gas control valve with an integrated solenoid valve and gas pressure regulator for gas appliances is provided with a cast body having a casting configured to receive a solenoid valve. The solenoid valve is received in the casting so as to be internally mounted within the control valve. A gas flow path is formed from the gas inlet of the gas control valve through the manual shutoff valve and the solenoid valve assembly to the gas outlet. The solenoid valve assembly controls flow of gas through this gas outlet.

20 Claims, 12 Drawing Sheets

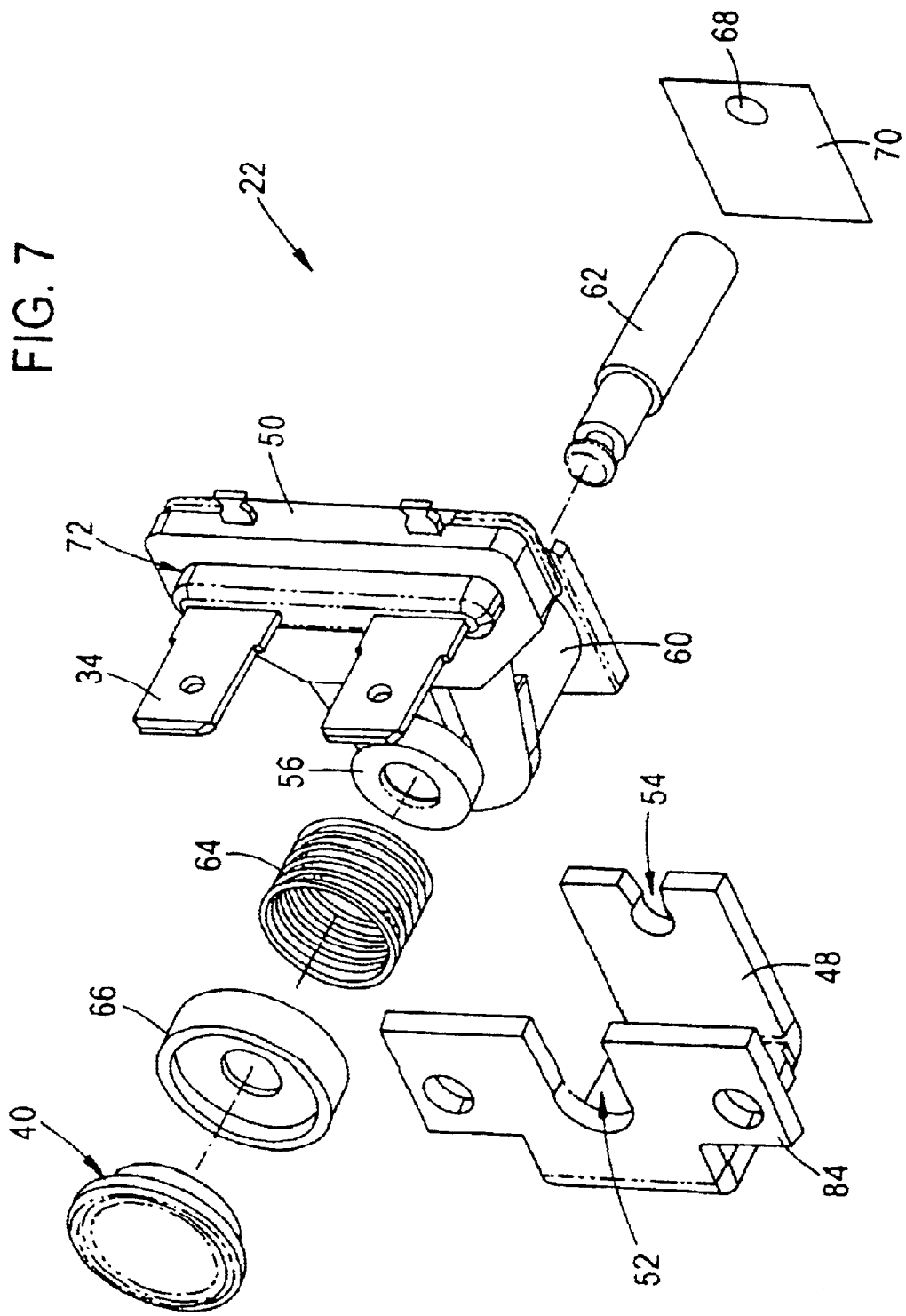

CONTROL VALVE WITH INTEGRAL SOLENOID AND REGULATOR FOR GAS APPLIANCES

RELATED APPLICATIONS

This application claims priority to provisional application serial No. 60/304,429, filed on Jul. 12, 2001.

FIELD OF THE INVENTION

The present invention relates to a control for gas appliances, such as gas ranges, and more particularly relates to an integrated control valve that integrates the function of a gas pressure regulator, a manual shutoff valve and a solenoid operated gas valve.

BACKGROUND OF THE INVENTION

Conventional controls for gas appliances, such as gas ranges, gas clothes dryers or gas water heaters, provide a regulated control of an unregulated gas supply. For example, with respect to a control used for gas ranges, an arrangement may have a single gas inlet from which an unregulated gas supply is connected and two outlets, which provide a pressure regulated gas supply. One of these outlets provides a direct connection from the output of the pressure regulator and is commonly used to provide a constant supply of gas, such as to the top burners of a gas range. The outlet is typically configured for some sort of pipe fitting to carry the gas to the top burners. The other gas outlet, when employed with a gas range, typically supplies the oven burner with gas. The gas from this outlet passes through the manual shutoff valve and then a solenoid operated gas valve. The manual shutoff valve is required to allow the user to manually shut off gas supplied to the solenoid valve in case of a malfunction.

In conventional arrangements, the solenoid valve is a separate component from the gas pressure regulator and manual shutoff valve. Hence, the solenoid assembly is external to the gas chamber and is exposed to the external environment and high operating temperatures. A high operating temperature of the solenoid assembly will cause degradation in the holding force performance of the solenoid assembly. Furthermore, an external solenoid assembly requires an intermediate substrate between the armature and the coil to seal the gas. This increases the distance between the coil and the armature of the solenoid, thereby reducing the magnetic coupling.

Another disadvantage of conventional constructions is that the coil is exposed to potential mechanical damage during shipping and handling. In order to avoid such mechanical damage, externally mounted coils are protected or encapsulated by a tape, adding to the cost of the control valve.

SUMMARY OF THE INVENTION

There is a need for a gas control valve that integrates the functions of a gas pressure regulator, manual shutoff valve and solenoid operating gas valve, but in a manner that reduces the degradation in the holding force performance of the solenoid valve, provides a superior magnetic coupling to the armature, and reduces the potential for mechanical damage during shipping and handling.

These and other needs are met by embodiments of the present invention which provide a control valve with integrated solenoid valve and regulator for gas appliances, comprising a cast body having a casting configured to receive a solenoid valve. The control valve includes a gas pressure regulator and a shutoff valve mechanism on the cast body. A solenoid valve is received in the casting so as to be internally mounted in the control valve.

The internal mounting of the solenoid valve within the casting allows a solenoid to be inside of the gas chamber rather than external to the chamber. This keeps the coil from being exposed to the external environment. As a result, the coil can stay cooler than those coils mounted externally because the gas flows around the assembly and cools it. The lower operating temperature reduces degradation in the holding force performance that can be caused by high temperatures.

The arrangement of the invention also allows for a superior magnetic coupling to the armature. The present invention does not require an intermediate substrate between the armature and the coil to seal the gas, which would increase the distance between the coil and the armature and reduce the magnetic coupling. Instead, a small solenoid can be used to attain the desired amount of force.

Furthermore, the arrangement of the solenoid valve received in the casting so as to be internally mounted within the control valve prevents the coil from being exposed to the potential for mechanical damage during shipping and handling. This avoids the need for protecting the coil with a tape, which would lead to additional costs.

The earlier stated needs are also met by other embodiments of the present invention which provide a gas control valve having a single cast body with a gas pressure regulator and manual shutoff valve mechanism. The gas control valve includes a gas chamber formed by the cast body, and a solenoid valve assembly with a coil and armature enclosed within the gas chamber. A cover seals the solenoid valve assembly within the gas chamber. The gas control valve has a gas inlet and a first gas outlet formed by an outlet of the gas pressure regulator. A second gas outlet of the gas control valve is formed on an outlet of the cover. There is a gas flow path from the gas inlet through the manual shutoff valve, the solenoid valve assembly and the second gas outlet. The solenoid valve assembly controls the flow of gas through the second gas outlet.

The foregoing and other features, aspects and advantages of the present invention will become more apparent from the following detailed description of the present invention when taken in conjunction with the accompanying drawings.

BRIEF DESCRIPTION OF THE DRAWINGS

FIGS. 6 and 7 show exploded views of a solenoid assembly constructed in accordance with the present invention from different perspectives.

FIG. 13A is a slightly perspective view, while FIG. 13B is a top-down view.

DETAILED DESCRIPTION OF THE INVENTION

The present invention addresses and solves problems related to the integration of functionality in a gas control valve of the gas pressure regulation, manual shutoff and a solenoid operated gas valve. In particular, the present invention overcomes some of the problems associated with a separate solenoid gas valve externally mounted to a gas pressure regulator and a manual shutoff valve. This is achieved, in part, by the provision of a solenoid gas valve assembly within a gas chamber of a cast body that is integral with the gas pressure regulator and a manual shutoff valve. The integration of the valve into the regulator reduces the number of parts and the labor required for assembly. The location of the solenoid assembly inside of the gas chamber keeps the coil from being exposed to the external environment. As a result, the coil can stay cooler than those mounted externally because the gas is flowing around the assembly and cools it. This lower operating temperature reduces degradation in the holding force performance caused by high temperatures. The configuration also allows for a superior magnetic coupling to the armature. An external solenoid, such as in the prior art, requires an intermediate substrate between the armature and the coil to seal off the gas. This increases the distance between the coil and the armature, thereby reducing the magnetic coupling. However, with the present invention, a smaller solenoid can be used to attain the desired amount of force. Because the solenoid valve is inserted within the gas chamber, the coil is not exposed to the potential for mechanical damage during shipping and handling, and reduces manufacturing costs since the coil does not have to be encapsulated or protected by tape.

Figure 1:
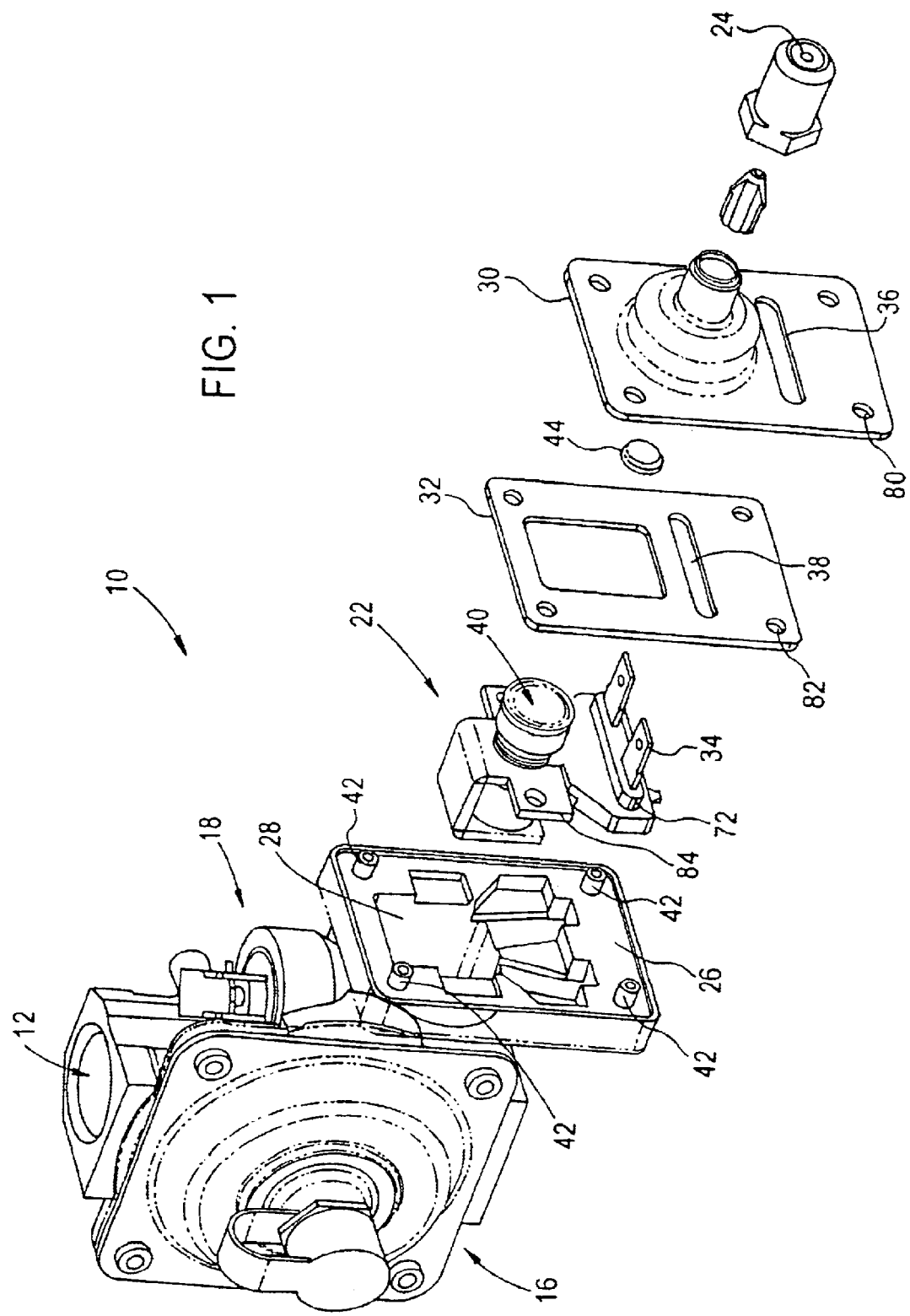
FIG. 1 is an exploded view of an integrated control valve constructed in accordance with embodiments of the present invention.
Figure 2:
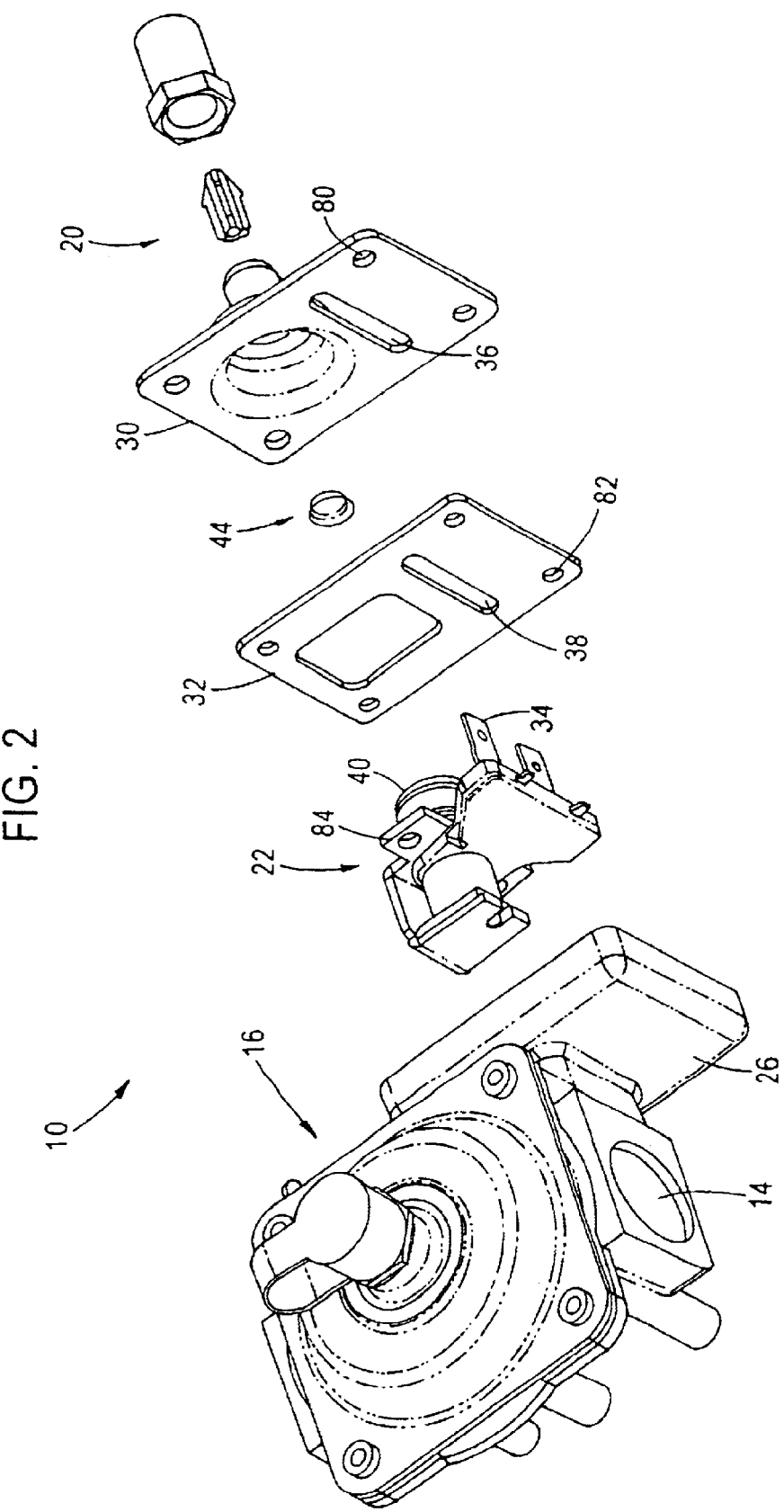
FIG. 2 shows the valve of FIG. 1 from a different angle.
Figure 3:
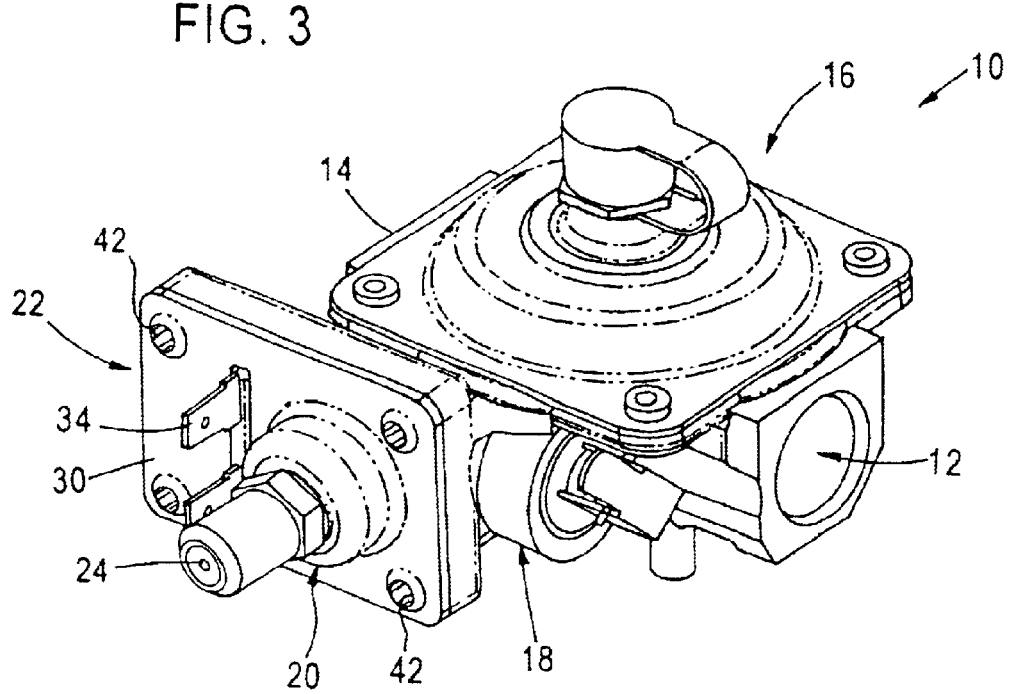
FIG. 3 depicts the gas control valve of the present invention in an assembled state, from a first perspective.
Figure 4:
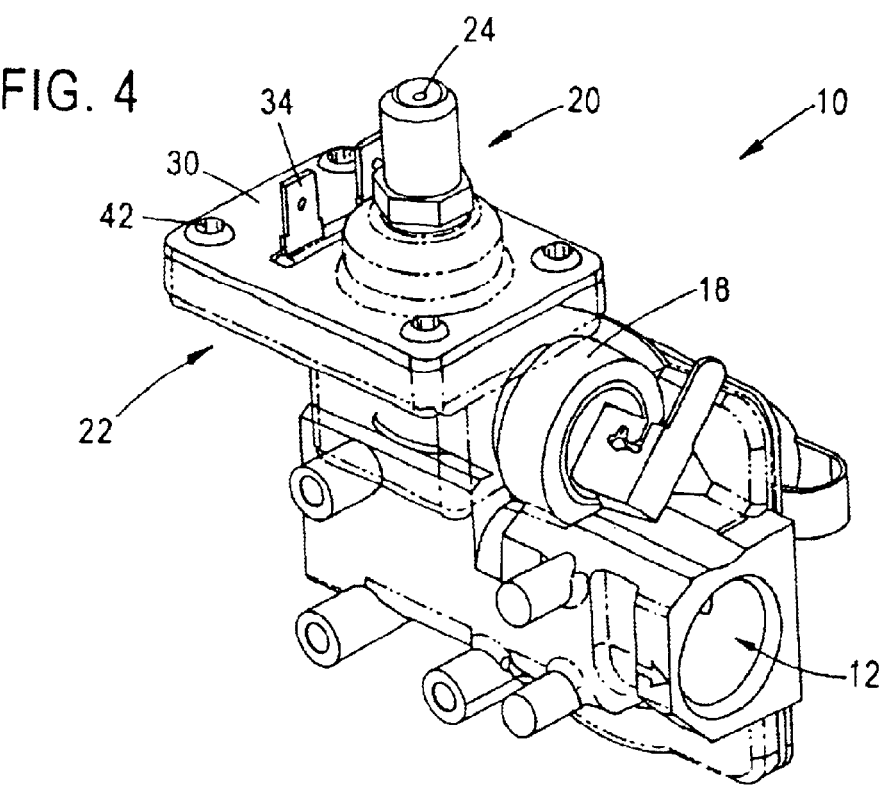
FIG. 4 shows the gas control valve of FIG. 3 from a different perspective.

FIGS. 1 and 2 depict exploded views of the gas control valve 10 of the present invention, taken from different perspectives. FIGS. 3 and 4 show the same valves, but in an assembled state, again taken from different perspectives. Referring now to FIGS. 1–4, the gas control valve 10 has a gas inlet 14 wherein an unregulated gas supply is connected. A first gas outlet 12, also referred to as the range gas outlet, provides a direct connection to the output of the regulator and may be used to provide a constant pressure supply of gas to the top burners of a gas range, for example. The first gas outlet 12 is typically configured for some sort of pipefitting to carry the gas to the top burners.

A second gas outlet 20, forming the oven gas outlet, for example, may be connected to supply an oven burner in a gas range that has one oven burner. The gas from the second gas outlet 20 passes through a manual shutoff valve 18 and then a solenoid valve assembly 22 (also referred to as a "solenoid valve"). The gas regulator 16 is also integrated into the control valve 10 and provides the pressure regulation of the gas.

The manual shutoff valve 18 is required to allow a user to manually shut off the gas supply to the solenoid valve assembly 22 in case of malfunction.

Figure 5:
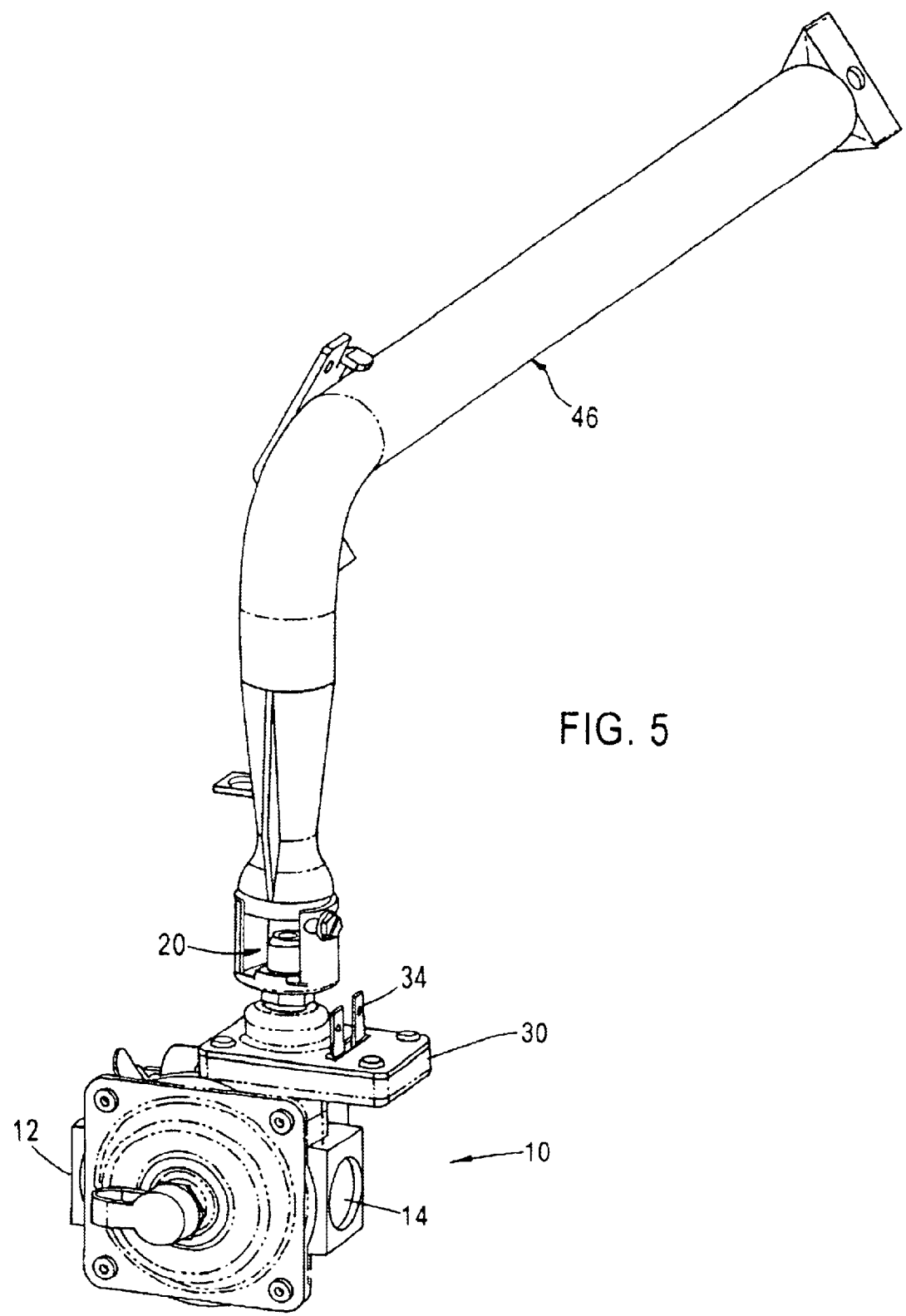
FIG. 5 shows the gas control valve of FIGS. 3 and 4 coupled to a venturi of an oven burner.
Figure 9:
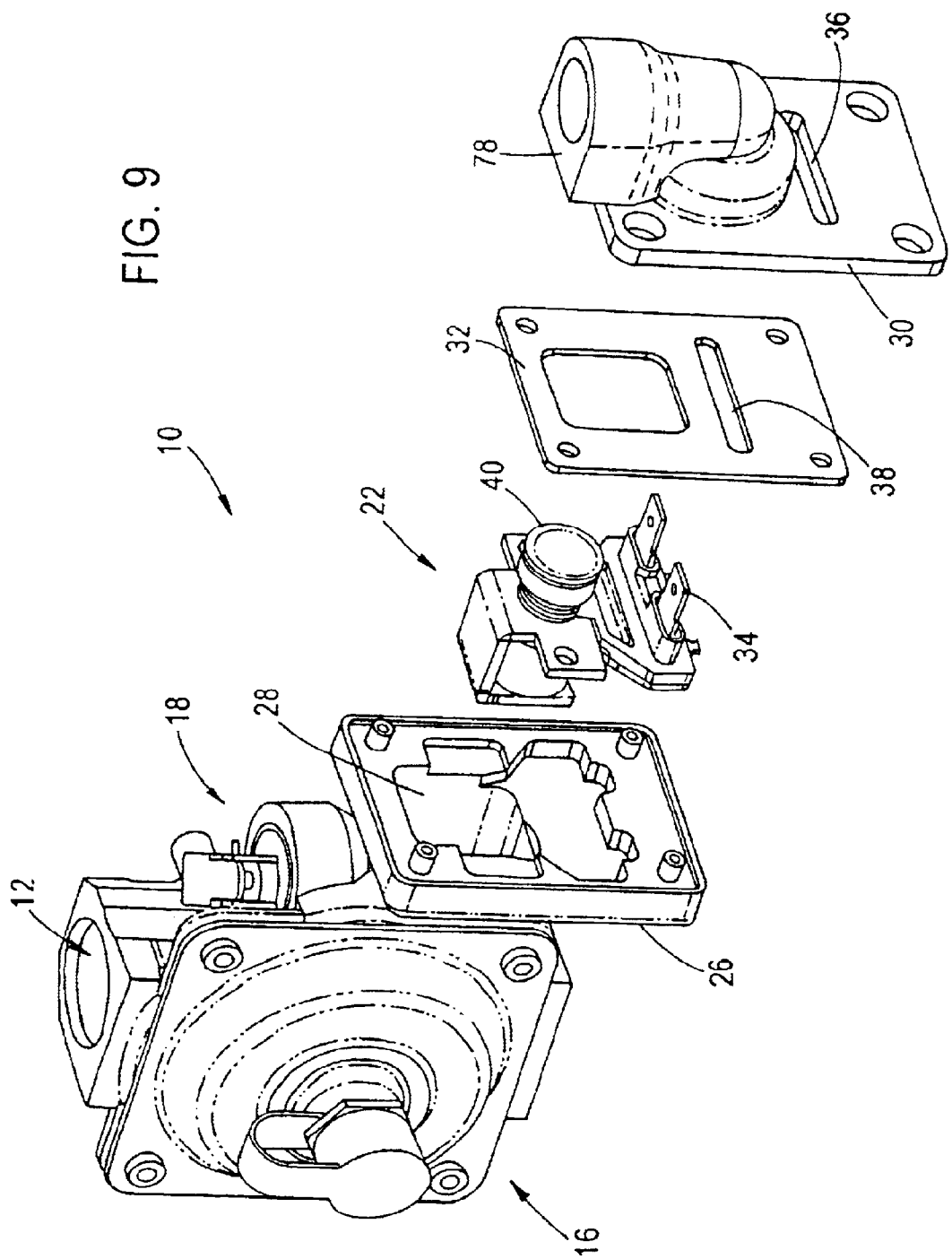
FIG. 9 shows an exploded view of the gas control valve of the present invention, but with a different gas outlet configuration on the cover of the solenoid valve assembly.

FIGS. 1–4 depict a gas orifice 24 of a certain configuration. As seen in FIG. 5, the gas orifice 24 at the second gas outlet 20 provides gas to a venturi 46 of the oven burner. The orifice assembly 24 may be connected to a male thread at the gas outlet 20 to control the flow of the gas from the second gas outlet 20. Referring briefly to FIG. 9, another embodiment of the gas control valve 10 employs a threaded fitting 78 to provide a connection to a remotely mounted orifice. Other outlet configurations can be employed by changing the cover of a solenoid valve assembly 22, as will become more apparent from the following descriptions.

Referring back to FIGS. 1–4, the gas control valve 10 has a cast body 26 with a gas chamber 28. As can be appreciated from the figures, the cast body 26 is directly formed with the gas control valve 10. The solenoid valve assembly 22 is inserted into the gas chamber 28 of the cast body 26, and thus integrates the function of a solenoid gas valve with that of a gas pressure regulator and a manual shutoff valve.

The solenoid valve assembly 22 includes electrical terminals 34 that carry electrical power to the solenoid valve assembly 22. A cover 30 seals the solenoid valve assembly 22 within the cast body 26. The cover 30 includes an opening 36 through which the terminals 34 extend. A first boss 72 on the solenoid valve assembly 22 closely mates with the opening 36.

A gas-tight seal is provided by a gasket 32 that has a corresponding opening 38 that also closely matches with the first boss 72. The gasket 32 is compressed by the cover 30 against the surfaces of the cast body 26. The cover 30 has holes 80 and the gasket 32 has holes 82 through which bosses on the cast body 42 extend when the gasket 32 and the cover 30 are assembled onto the cast body 26. These bosses 42 are rolled over to stake the cover 30 onto the cast body 26 during assembly. A screen 44 is inserted into the cover 30 prior to assembly.

Tabs 84 of the solenoid valve assembly 22 are trapped between the gasket 32 and the cast body 26 during assembly. When the cover 30 is staked, the gasket 32 compresses and firmly retains the solenoid valve assembly 22 without the use of fasteners. The raised first boss 72 on the solenoid valve assembly 22 registers directly to the opening 36 and the cover 30. This construction significantly reduces tolerances involved in centering the valve seal 40 on the sealing surface (not shown). By contrast, typical solenoid mounting schemes involve attaching the solenoid frame to a mounting surface, which then positions it at the point of interest.

Figure 6:
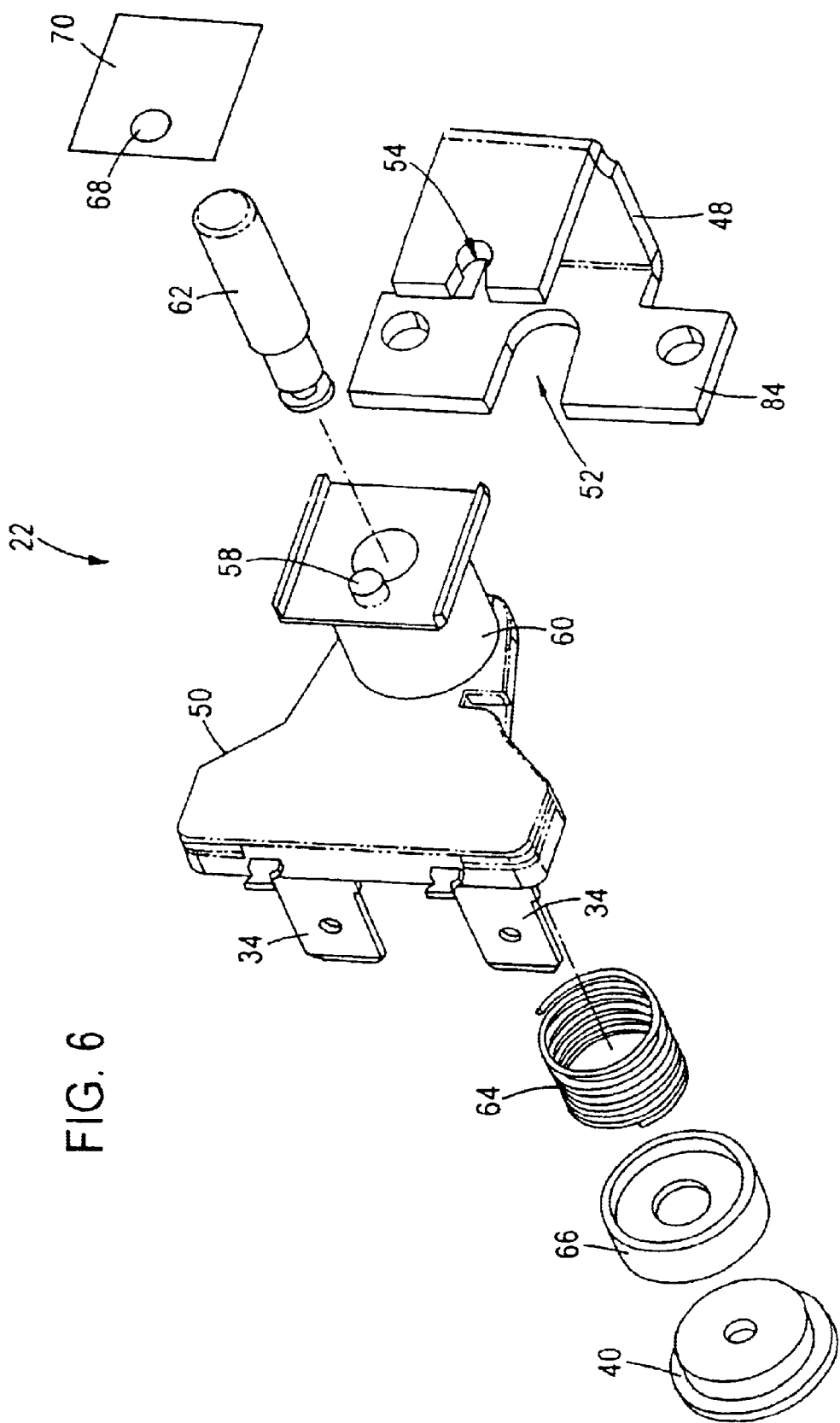

Referring now to FIGS. 6 and 7, exploded views of a solenoid valve assembly 22 constructed in accordance with certain embodiments of the present invention are depicted from different perspectives. The solenoid valve assembly 22 is held by a frame 48 having a first recess 52 and a second recess 54. The solenoid valve assembly 22 includes a bobbin 50 on which a coil 60 and an armature 62 are carried.

The bobbin 50 has a second boss 56 and a third boss 58 that provide snap-in connections to the first and second recesses 52, 54. The snap-in connections connect the bobbin 50 to the frame 48.

A spring 64 returns the armature 62 from its energized position to its unenergized position. A spring retaining washer 66 retains the return spring 64 in position, and also holds the valve seal 40.

A sound absorbing pad 70, made of Teflon, for example, prevents metal to metal contact. The sound absorbing pad 24 is registered to the bobbin 50 by the third boss 58 and a hole 68 in the sound absorbing pad 70.

Figure 8A:
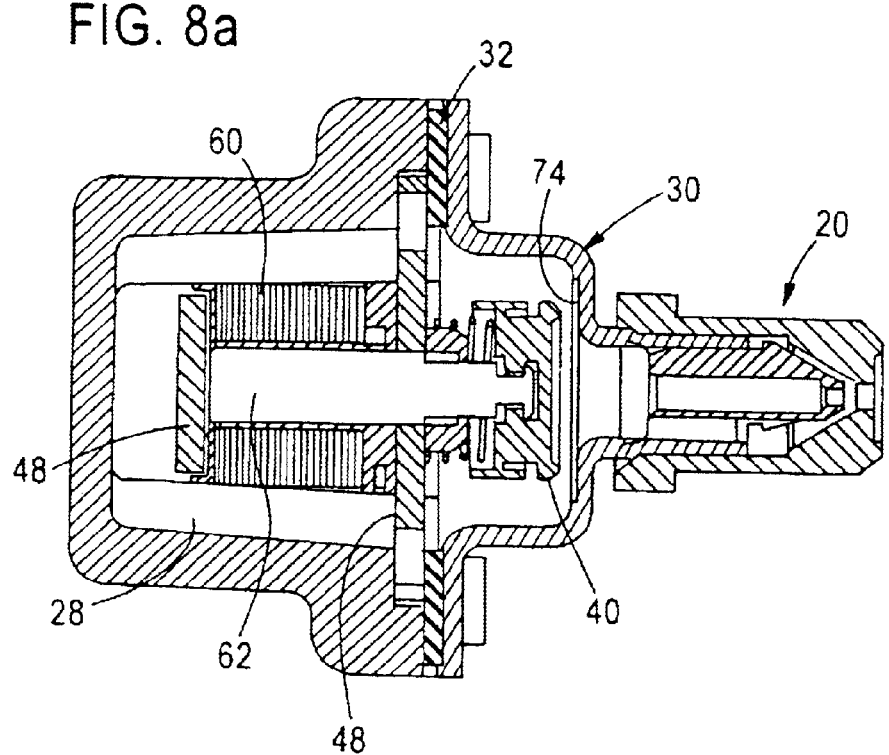
FIGS. 8A and 8B depict a cross-section of the solenoid valve inserted within the gas chamber of a cast body of the gas control valve according to embodiment of the present invention.

FIG. 8A shows the solenoid valve assembly 22 in cross-section with the valve open and the armature 62 pulled in with the coil 60 energized. The valve seal 40 is lifted off the valve opening 74 on the cover 30.

Figure 8B:
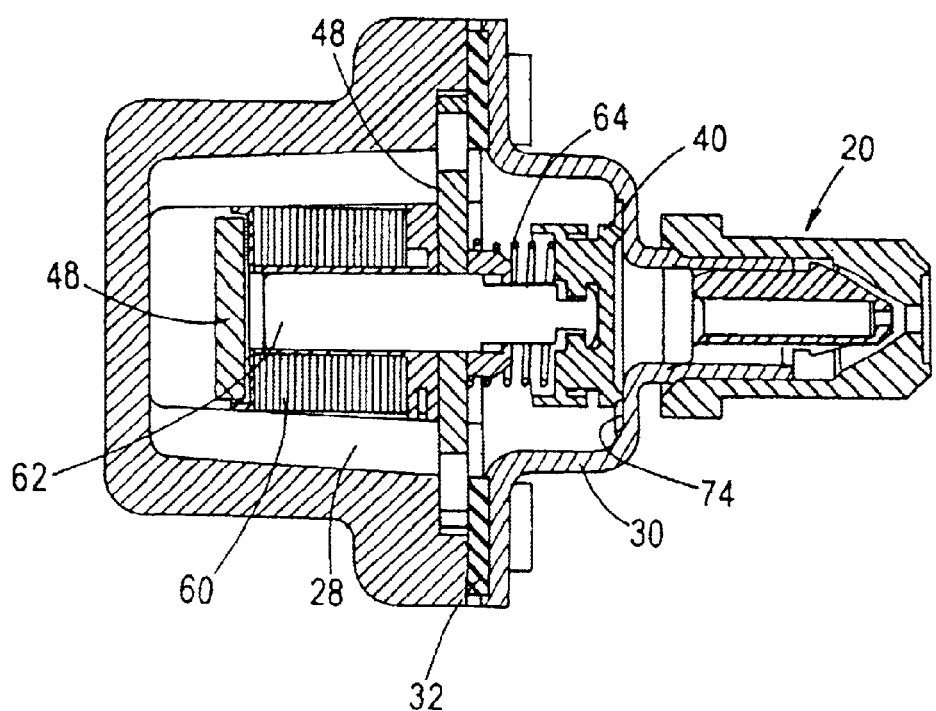

In FIG. 8B, the valve opening 74 is closed when the solenoid valve assembly 22 is de-energized (the coil 60 de-energized) and the armature 62 is extended. As can be appreciated from FIGS. 8A, 8B, the coil 60 is located within the gas chamber 28 so that gas may flow around the coil 60 and thereby cool the coil 60. This lower operating temperature reduces degradation in the holding force performance due to high temperatures. The configuration also allows for a superior magnetic coupling to the armature, since it does not require an intermediate substrate between the armature and the coil to seal the gas. Because of this, a smaller solenoid can be used to attain the desired amount of force. Also, by locating the solenoid valve assembly 22 within the gas chamber 28, the coil 60 is not exposed to potential mechanical damage during shipping and handling.

The assembly of the gas control valve 10 is an elegant process that lends itself to automated assembly. As can be appreciated from FIGS. 1 and 2, the parts can be assembled in one direction into the gas chamber 28 (a cavity) in the cast body 26. The solenoid assembly 22, after being fitted together by the snap connections formed by the second and third bosses 56, 58 and the first and second recesses 52, 54 of the frame 48, is inserted first. The gasket 32 is fitted over the bobbin 50 of the solenoid valve assembly. The first boss 72 extends through the opening 38 and the gasket 32. Similarly, the bosses in the cast body 26 extend through the openings 82 and the gasket 32. The tabs 84 fit within the recesses in the cast body 26. The cover 30 is then placed over the gasket 32, with the first boss 72 and terminals 34 extending through the opening 36 in the cover 30. The cover 30 is staked onto the cast body 26 by rolling over the four bosses 42 on the cast body 26 that protrude through the openings 80 in the cover 30. The screen 44 is inserted into the cover 30 prior to the completion of the assembly. The adjustable orifice 24 is assembled to the cover at any time during the assembly process.

Alternative embodiments of the present inventions are depicted in FIGS. 10–15. The solenoid action is inverted, in comparison to that the embodiments of FIGS. 1–9, to provide the actuation from the end opposite the electrical terminals 88, in comparison to the embodiments of FIGS. 1–9 in which the actuation originates from the same end as the terminals 34. This allows the main enclosure 92, typically a casting, to have a bottom 96 that is machined to provide a sealing area for the valve 98. This simplifies the stamped metal cover 94 that is placed over the solenoid by eliminating the drawn portion, as depicted in the cover 30 of the embodiments of FIGS. 1–9. The embodiment of FIGS. 10–15 also eliminates a need for a cover 30 made of a casting for applications that require the outlet to be at a 90° angle from the solenoid actuation. In both cases, this simplifies the tooling and significantly lowers the cost. Another advantage of this construction is that the rubber gasket 90 is now against the portion of the solenoid frame 87 that the armature 89 strikes when the armature pulls in. This significantly lowers the noise level when the armature 89 pulls in.

Figure 10:
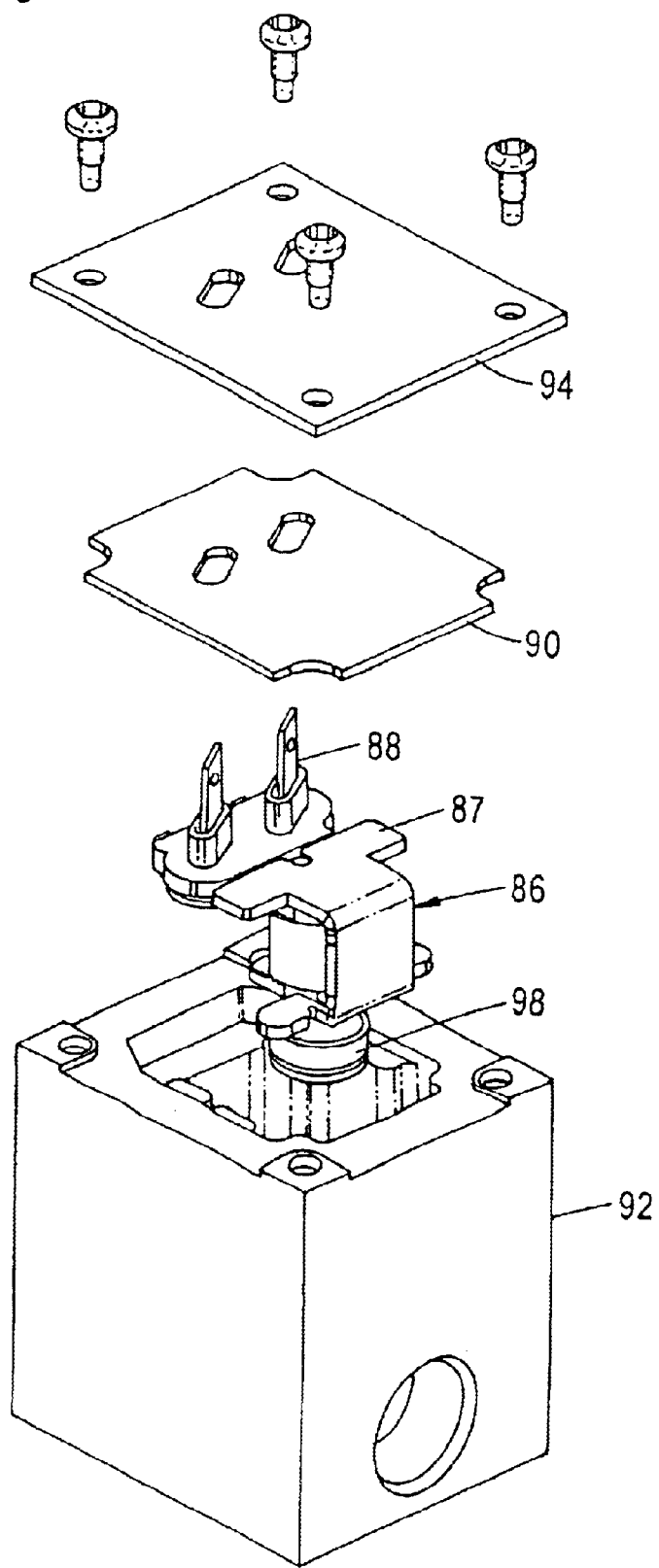
FIG. 10 depicts a gas control valve constructed in accordance with alternative embodiments of the present invention.
Figure 11:
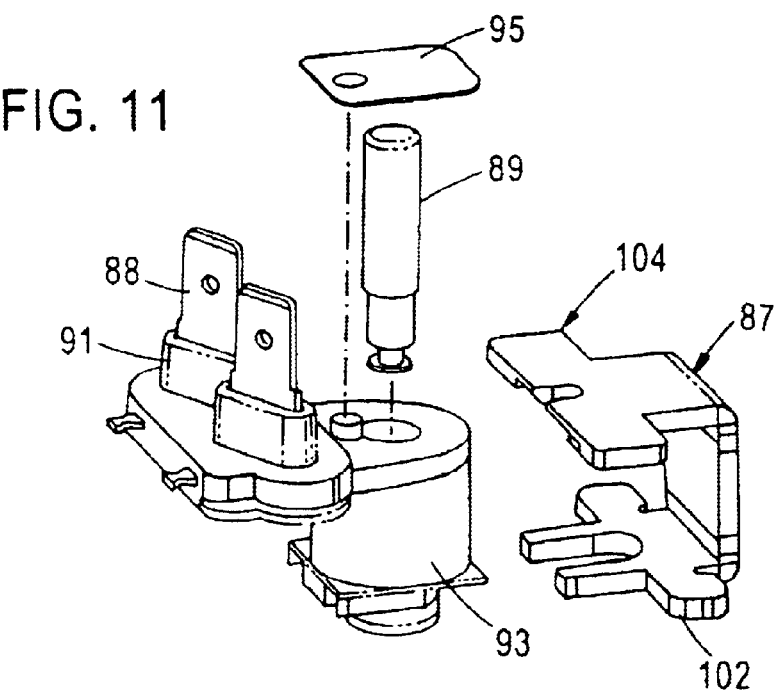
FIGS. 11 and 12 show exploded views of the solenoid valve assembly employed with the alternative embodiment of FIG. 10.
Figure 12:
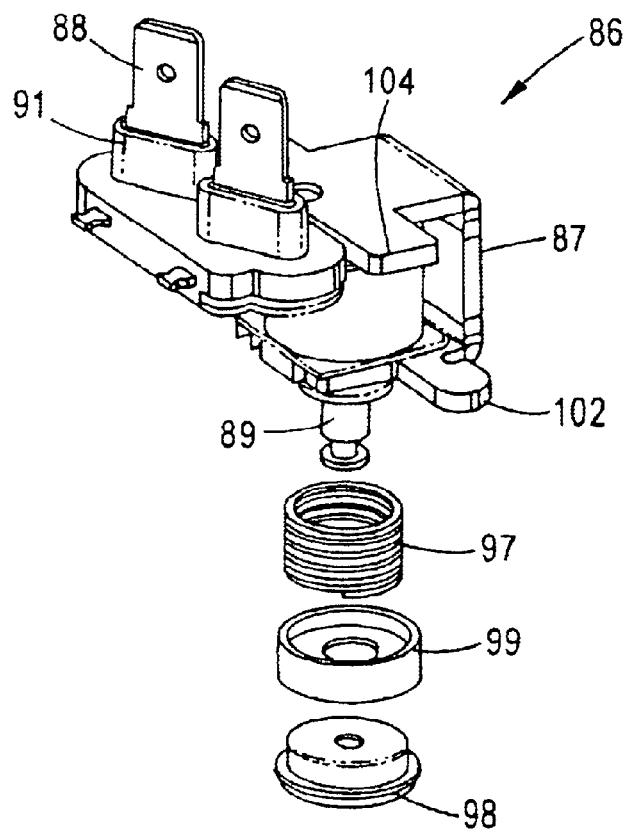
Figure 13A:
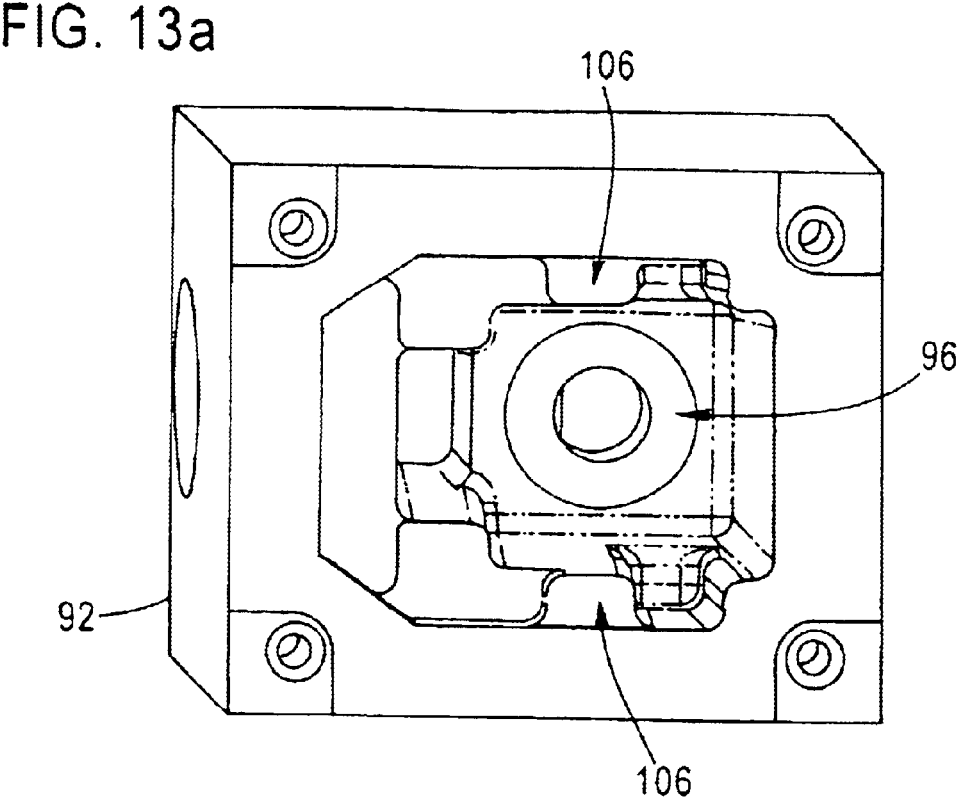
FIGS. 13A and 13B show the enclosure into which a solenoid assembly valve of FIGS. 11 and 12 is inserted.
Figure 13B:
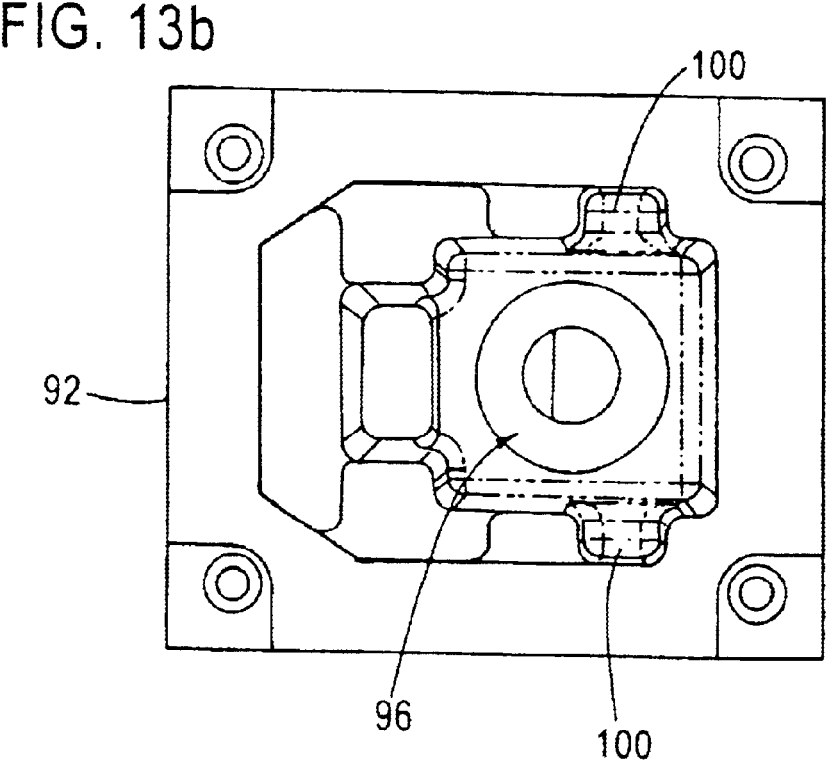

The construction and assembly of the solenoid are shown in FIGS. 11–12. The solenoid assembly 86 has inserted molded terminals 88 with a sealing face 91 that is formed around the terminals 88. The armature 89 is inserted into the bore of the coil 93 and a magnetic shading pad 95 is placed over the top. The coil 93, the armature 89 and the magnetic shading pad 95 are then snapped into the frame 87 to create the assembly 86 depicted in FIG. 12. A return spring 97, spring washer 99 and valve seal 98 are assembled to the end of the armature 89, thereby completing the solenoid assembly. The solenoid assembly 86 is inserted into the enclosure shown in FIGS. 13A and 13B. At the bottom of the enclosure are pockets 100 that receives the two tabs 102 on the solenoid frame 87 to register the solenoid assembly 86 to the sealing surface 96. The tabs 104 on the solenoid frame at the terminal end rest on a pad 106 of the enclosure to set the height of the solenoid assembly 86. The rubber gasket 90 is then placed over the solenoid assembly 86 with the terminals 88 protruding therethrough. The stamped cover 94 is then placed over the gasket 90 and fastened in place. Although FIG. 10 depicts screw fasteners, other fastening methods can be used. When the rubber gasket 90 is compressed, it sandwiches the tabs 104 on the solenoid frame 87 between the enclosures and the gasket 90 and fastens the solenoid assembly 86 in place.

Figure 14:
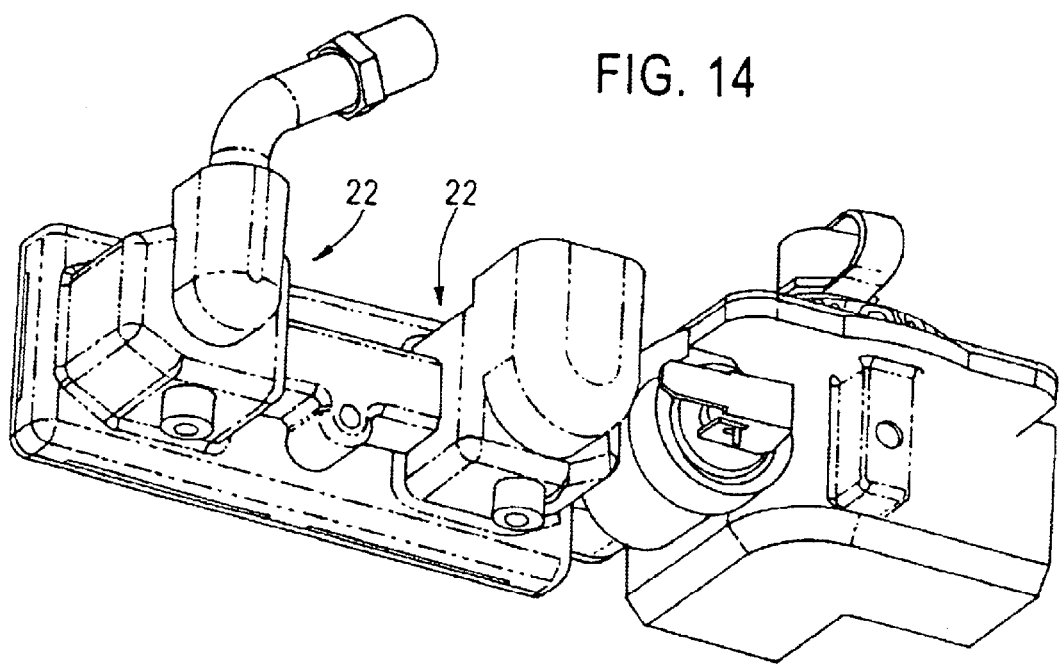
FIGS. 14 and 15 respectively illustrate the solenoid assembly of the present invention arranged in a gas supplying application, as viewed from different perspectives.
Figure 15:
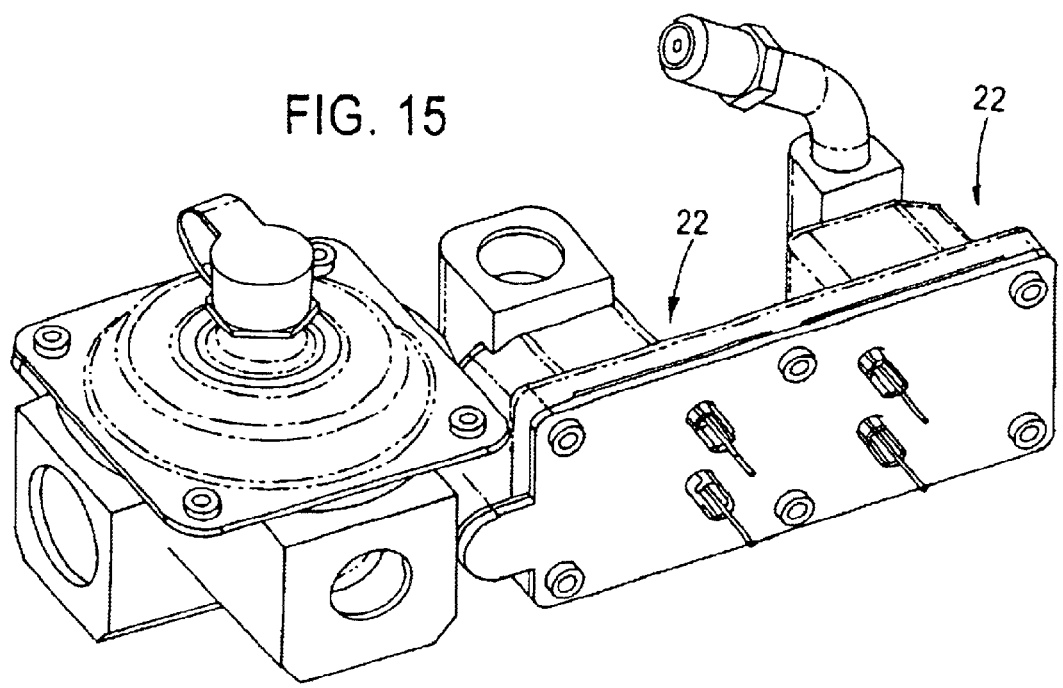

FIGS. 14 and 15 show embodiments in which two solenoid assemblies, such as solenoid assembly 22, may be employed in an exemplary application. A plurality of these solenoid valve assemblies 22 may be used in a control with a regulator or the valve or may stand alone.

Although the present invention has been described and illustrated in detail, it is to be clearly understood that the same is by way of illustration and example only and is not to be taken by way of limitation, the scope of the present invention being limited only by the terms of the appended claims.

What is claimed is:

1. A control valve with integrated solenoid valve and regulator for gas appliances, comprising:
   a cast body having a casting configured to receive a solenoid valve;
   a gas pressure regulator and a shutoff valve mechanism on the cast body; and
   a solenoid valve received in the casting so as to be internally mounted within the control valve.

2. The control valve of claim 1, wherein the casting is configured with a gas chamber, and the solenoid valve is mounted within the gas chamber.

3. The control valve of claim 2, wherein the gas chamber has an inlet connected to an outlet of the shutoff valve mechanism, and an outlet with a valve opening.

4. The control valve of claim 3, wherein the solenoid valve has a coil and an armature within the gas chamber such that the coil is exposed to gas flow through the gas chamber.

5. The control valve of claim 4, further comprising a cover attached to the casting to enclose the solenoid valve within the gas chamber, the cover having an inlet formed by the gas chamber outlet, and an outlet.

6. The control valve of claim 5, wherein the solenoid valve includes a valve seal on a first end of the armature and positioned to selectively interact with the valve opening to open and close the gas chamber outlet.

7. The control valve of claim 6, further comprising electrical terminals connected to the solenoid valve, the electrical terminals extending through the cover.

8. The control valve of claim 7, the solenoid valve further comprising a bobbin on which the coil and the electrical terminals are mounted, the bobbin including a first boss through which the electrical terminals extend.

9. The control valve of claim 8, wherein the cover includes a first opening that directly registers with the first boss, which extends through said first opening, to thereby position the bobbin within the gas chamber.

10. The control valve of claim 9, the solenoid valve further comprising a frame having at least a first recess, the bobbin having at least a second boss, the second boss being held within the first recess to secure the bobbin to the frame.

11. The control valve of claim 10, further comprising a sound absorbing material positioned within the solenoid valve at a second end of the armature such that the armature strikes the sound absorbing material at one position of the armature.

12. The control valve of claim 11, wherein the bobbin includes a third boss, the frame has a second recess, and the sound absorbing material is a pad having a hole, the third boss: being held within the second recess to further secure the bobbin to the frame; and extending through the hole in the pad to register the pad to the bobbin.

13. The control valve of claim 12, wherein the first recess and the second boss, and the second recess and the third boss, form snap connections.

14. The control valve of claim 13, wherein the actuation of the solenoid originates at a same end as the electrical terminals.

15. The control valve of claim 7, wherein the actuation of the solenoid originates at an end opposite to the electrical terminals.

16. A gas control valve having a single cast body with a gas pressure regulator and a manual shutoff valve mechanism, comprising:

a gas chamber formed by the cast body;

a solenoid valve assembly with a coil and armature enclosed within the gas chamber;

a cover sealing the solenoid valve assembly within the gas chamber;

a gas inlet to the gas control valve;

a first gas outlet of the gas control valve formed by an outlet of the gas pressure regulator;

a second gas outlet of the gas control valve formed at an outlet of the cover; and a gas flow path from the gas inlet through the manual shutoff valve, the solenoid valve assembly and the second gas outlet, the solenoid valve assembly controlling flow of gas through the second gas outlet.

17. The gas control valve of claim 16, wherein the solenoid valve assembly is positioned within the gas chamber such that the coil is within the gas flow path.

18. The gas control valve of claim 17, wherein the cover has at least one opening and the solenoid valve assembly has electrical terminals that extend through the at least one opening.

19. The gas control valve of claim 18, wherein the solenoid valve assembly includes a bobbin carrying the coil and armature.

20. The gas control valve of claim 19, wherein the solenoid valve assembly includes a frame with recesses, and the bobbin includes bosses that snap connect the frame to the bobbin.

* * * * *